Patented June 18, 1929.

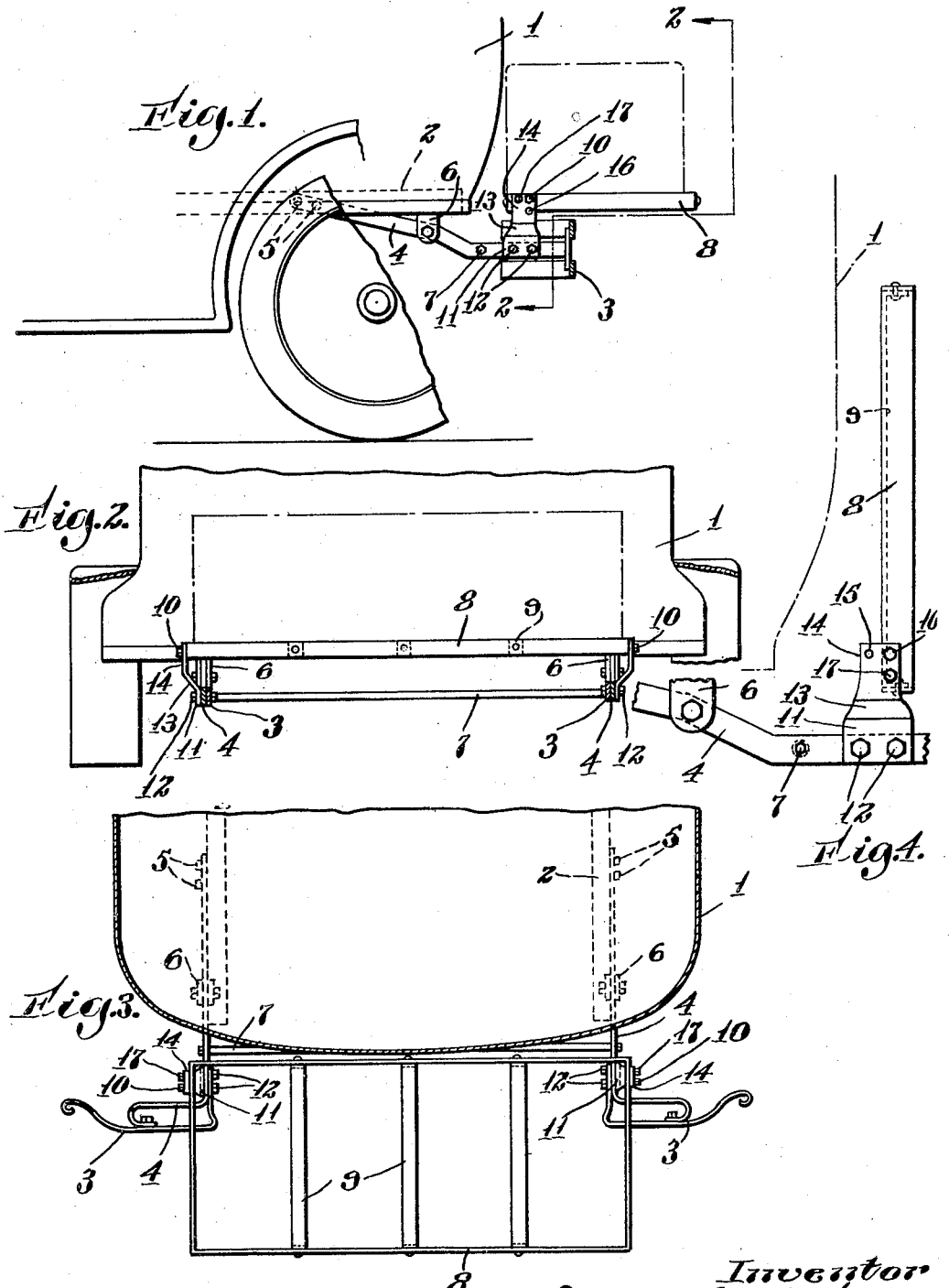

1,718,205

UNITED STATES PATENT OFFICE.

EGERTON B. McNEAR, OF NEEDHAM, MASSACHUSETTS, ASSIGNOR TO GEORGE W. McNEAR, INC., OF BOSTON, MASSACHUSETTS, A CORPORATION OF MASSACHUSETTS.

AUTOMOBILE TRUNK RACK.

Application filed September 6, 1928. Serial No. 304,325.

The present invention relates to automobile trunk racks, and more particularly to a novel trunk rack particularly adapted for attachment to a Ford automobile.

An important object of the present invention is the provision of a trunk rack which may be applied or attached to the present Ford automobiles.

A further object of the invention resides in the provision of a rack which is simple to construct and manufacture, but which is strong and rugged.

Another feature of the invention resides in the ease and facility with which my present novel rack may be applied to the automobile.

A still further object of the invention resides in the fact that my novel rack is attached to the bumper brackets of the new Ford automobiles in such a position that the same bolts are utilized to hold both the trunk rack bracket and the bumpers or bumperettes. Thus the trunk brackets and the bumpers are both mounted on the same brackets at the same time.

A further object of the invention resides in the fact that my novel rack is pivotally mounted on its brackets, and removable means are provided for rigidly securing said rack in either extended or folded position.

Another feature of the invention consists in the fact that by the use of my novel rack brackets, I am enabled to obtain considerable width in the trunk rack, extending said rack beyond the width of the chassis frame members on each side.

The above and other objects of the invention, details of construction, combinations of parts, and advantages, will be hereinafter more fully described, pointed out and claimed.

Referring to the drawings, illustrating a preferred embodiment of the present invention, Fig. 1 is a side elevation of the rear of a new Ford sedan with my novel trunk rack attached and in extended position;

Fig. 2 is a vertical sectional view on the line 2—2 of Fig. 1;

Fig. 3 is a top plan of my novel trunk rack in extended position; and

Fig. 4 is a side elevation, on enlarged scale, of my novel rack in folded or vertical position.

Referring now to the drawings, for a particular description of my invention, its construction, assembly and attachment, 1 designates the body of a new Ford sedan, said body being mounted on a chassis 2. Said chassis does not extend beyond the body 1, either at the rear or sides, and in order to affix the bumperettes 3, a pair of brackets 4 are attached to the chassis 2 by bolts 5 and then inclined downwardly toward the rear. Rearwardly of the bolts 5, and on each side of the chassis, is a strap 6 to which the brackets 4 are also affixed. A tie rod or brace 7 unites these brackets 4 for rigidity and strength.

My novel trunk rack per se comprises a frame 8 having a plurality of cross arms 9 riveted or otherwise secured therein. This frame is pivotally attached, at 10, to a bracket 11 which is secured to the bracket 4 by removing the regular bumper bolts and substituting therefor slightly longer bolts 12.

These bolts 12 therefore hold both the bumperette 3 and bracket 11 rigidly in position. The bracket 11 is flared outwardly, as at 13, and its upper end 14, in which is the pivot 10, is provided with a pair of apertures or holes 15 and 16. When in extended position, as illustrated in Figs. 1, 2 and 3, the rack is rigidly held in position by a bolt 17 extending through the hole 15, and through a corresponding hole in the frame 8 of the trunk rack. When it is desired to collapse or fold the rack, however, the bolt 17 is removed, the frame 8 pivoted on its pivot 10, until the above mentioned hole in the frame 8 is alined with the hole 16 in the bracket 11, whereupon the bolt 17 is replaced and the rack 6 held rigidly in folded position, as illustrated in Fig. 4.

By outwardly flaring the brackets 11 as shown at 13, a longer trunk rack is provided than is possible with straight brackets, and these brackets 11 are sufficiently high to prevent the frame from striking or interfering with the brackets 4 or with the bumpers or bumperettes. The upper portions 14 of the said brackets are set off-center, toward the rear, relative to the portion of the bracket 11 which is fixed to the bracket 4 by the bolts 12, to permit folding of the rack thereon without contacting with the body 1.

It will thus be seen that I have devised an extremely simple, efficient, strong and satisfactory trunk rack, particularly adapted for use on the new Ford automobiles.

I believe that my trunk rack, as above described, is novel and I have therefore claimed the same in the present application.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. The combination with the bumper brackets of an automobile, of a pair of brackets rigidly secured thereto by the same bolts that hold the bumpers to said first mentioned brackets, a rack pivotally secured to said last mentioned brackets, and means to rigidly hold said rack in extended or folded position.

2. The combination with the bumper brackets of an automobile, of a pair of upwardly extending, outwardly flared brackets rigidly secured thereto by the same bolts that hold the bumpers to said first mentioned brackets, a rack pivotally secured to said last mentioned brackets, and means to rigidly hold said rack in extended or folded position.

3. The combination with the bumper brackets of an automobile, of a pair of upwardly extending, outwardly flared brackets rigidly secured thereto by the same bolts that hold the bumpers to said first mentioned brackets, a rack pivotally secured to said last mentioned brackets, means to rigidly hold said rack in extended or folded position, the upper portions of said last mentioned brackets being set off-center to permit said rack to be folded without contacting with the body of said automobile.

4. The combination with the bumper brackets of an automobile, of a pair of upwardly extending, outwardly flared brackets rigidly secured thereto, a rack pivotally secured to the upper portion of said last mentioned brackets, each of said last mentioned brackets being provided with a pair of apertures, said rack having an aperture in each end thereof, the apertures in said rack being alternately alined with the apertures in said brackets when said rack is in extended or folded position, and removable means cooperating with said alined apertures to rigidly hold said rack in extended or folded position.

In testimony whereof, I have signed my name to this specification.

EGERTON B. McNEAR.